(12) United States Patent
Modaresi

(10) Patent No.: US 7,735,436 B2
(45) Date of Patent: Jun. 15, 2010

(54) GRANULE DISPENSING TOOL

(76) Inventor: Heidar A. Modaresi, 3060 Wimbledon La., Rock Hill, SC (US) 29732-9249

( * ) Notice: Subject to any disclaimer, the term of this patent is extended or adjusted under 35 U.S.C. 154(b) by 0 days.

(21) Appl. No.: 12/246,145

(22) Filed: Oct. 6, 2008

(65) Prior Publication Data
US 2010/0083885 A1 Apr. 8, 2010

(51) Int. Cl.
A01C 5/02 (2006.01)
(52) U.S. Cl. ....................................... 111/95
(58) Field of Classification Search ............. 111/89–99
See application file for complete search history.

(56) References Cited

U.S. PATENT DOCUMENTS

| 2,370,744 | A | * | 3/1945 | Molinare | 111/96 |
| 2,737,318 | A | * | 3/1956 | Molinare | 222/191 |
| 3,202,120 | A | * | 8/1965 | Laffler | 111/96 |
| 4,206,714 | A | * | 6/1980 | Walsh | 111/92 |
| 4,413,440 | A | * | 11/1983 | Schultz | 43/124 |
| 4,614,160 | A | * | 9/1986 | Curlett | 111/96 |
| 4,637,328 | A | * | 1/1987 | Topham et al. | 111/89 |
| 4,760,807 | A | * | 8/1988 | Keller | 111/92 |
| 5,040,471 | A | * | 8/1991 | Lamont, Jr. | 111/108 |
| 5,063,863 | A | * | 11/1991 | Peterson | 111/93 |
| 5,131,570 | A | * | 7/1992 | Sawyer, III | 222/175 |
| 5,339,994 | A | * | 8/1994 | Nuila | 222/175 |
| 5,497,713 | A | * | 3/1996 | Anderson et al. | 111/92 |
| 6,662,736 | B1 | * | 12/2003 | Lowe et al. | 111/96 |
| 6,981,457 | B2 | * | 1/2006 | Stolz | 111/130 |
| 2003/0233969 | A1 | * | 12/2003 | Stolz | 111/92 |
| 2005/0268829 | A1 | * | 12/2005 | Longo | 111/92 |
| 2007/0113762 | A1 | * | 5/2007 | Phillips | 111/96 |

FOREIGN PATENT DOCUMENTS

GB 2155296 A * 9/1985

* cited by examiner

Primary Examiner—Christopher J. Novosad
(74) Attorney, Agent, or Firm—Adams Intellectual Property Law

(57) ABSTRACT

A granule dispensing device is provided and includes a chamber having a predetermined volume for housing granules and defining a flow path for a flow of granules, a valve assembly for controlling the flow path, and an actuator configured to actuate the valve assembly for dispensing the granules.

9 Claims, 6 Drawing Sheets

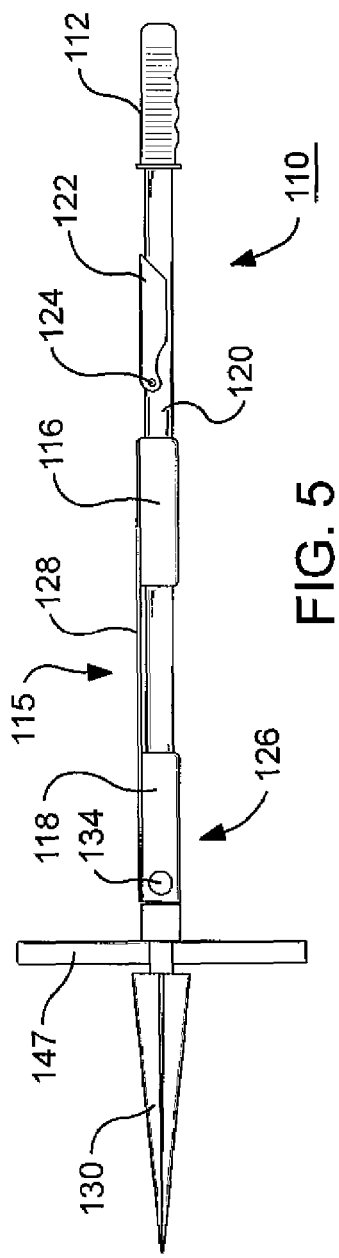
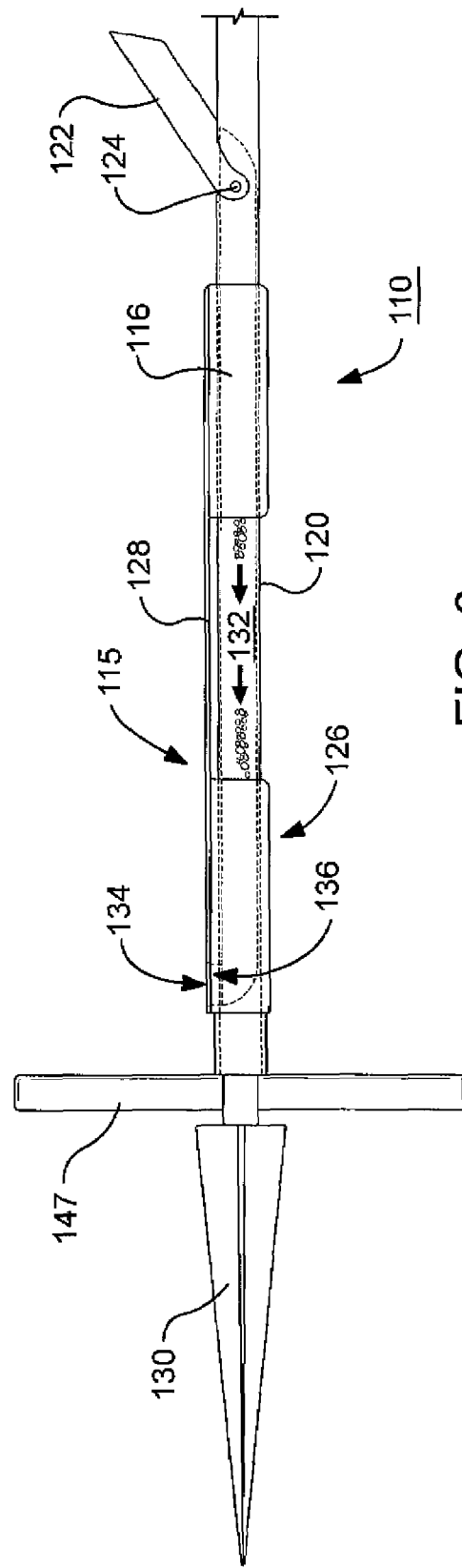

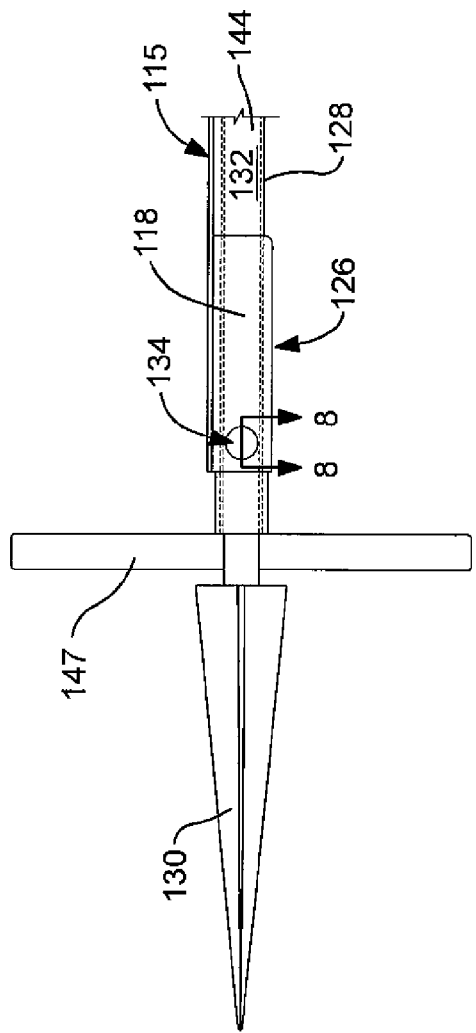
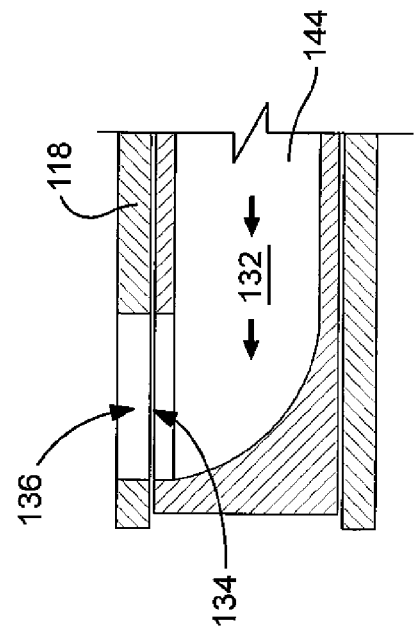
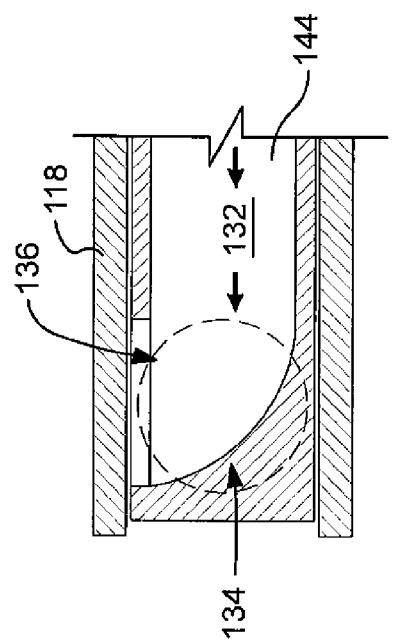
FIG. 7
FIG. 8b
FIG. 8a

GRANULE DISPENSING TOOL

FIELD OF THE INVENTION

This application is directed towards a granule dispensing device, and more particularly, to a granule dispensing device for dispensing fertilizer proximal to shrubbery, garden plants, trees, and other vegetation.

Fertilizing of plants, trees, and other vegetation is important for a variety of reasons. Plants are a source of food, an essential source of depolluting the air, and aesthetically pleasing. Encouraging gardening enhances community involvement, beautifies neighborhoods, and ultimately leads to a healthier nation. Conventional methods for dispensing fertilizer include broadcasting fertilizer by hand, broadcasting by a fertilizer spreader or similar broadcaster, or spraying a water soluble fertilizer towards vegetation to be fertilized.

There are several problems associated with conventional methods of fertilizing. These problems include the fact that conventional methods use imprecise means of determining the amount of fertilizer delivered to the plants. Conventional methods are cumbersome and entail unusual and often uncomfortable and awkward manipulations when trying to fertilize overgrown, dense plant populations, or entail disorderly or thorny branches. Conventional methods are laborious and may entail dangerous ergonomic posturing because they require the person to carry and use more than one gardening tool, and when the plants to be fertilized are dense or with sharp or long branches, they often lead to minor or serious injuries to exposed body parts while the person tries to negotiate the unyielding, sharp branches to the base of the plant to be fertilized. Conventional fertilizing requires the person fertilizing to repeatedly bend or kneel in order to reach the desired fertilizing location under a plant, and, accordingly, increases the chances of serious musculoskeletal and ergonomic injuries to the person fertilizing. Finally, proper fertilizing of a tree or other deep rooted plant entails one person digging several holes at a tree drip line by shoveling out dirt from the ground to provide room for the fertilizer, then dispersing fertilizer into the cavity formed from the removed soil. In the conventional method of fertilizing a tree, some of the dug out soil may be returned on top of each cavity containing the fertilizer, but further work is required for cleaning up the remaining dirt left behind. This conventional method of fertilizing trees is typically a multiple person job, and may be stressful on the person's back and knees.

The problems associated with conventional gardening methods discourage timely and correct fertilizing of plants, particularly in cases when there are multiple plants to be fertilized and/or the person responsible for fertilizing plants has physical or manpower limitations.

Dispensing precise amounts of fertilizer to a desired location proximal a plant is crucial for obtaining the intended benefits of fertilizing. Insufficient fertilizer and imprecise delivery does not provide the plant with sufficient nutrients and too much fertilizer may kill the plant or provide unnecessary and environmentally damaging fertilizer runoff. Conventional methods of fertilizing do not allow such precise delivery to a particular area, particularly, when the plants to be fertilized are overgrown, dense, or thorny. Conventional methods often do not allow fertilizer to reach a desired area and instead fertilize the undergrowth or unwanted foliage in the neighboring areas. This creates more dense undergrowth, thus making the fertilizing step completely counterproductive. In other instances, the fertilizer is broadcast on the soil surface and does not reach plant roots.

Accordingly, the present invention was conceived to provide a versatile device for delivering and dispensing measured quantities of fertilizer to a desired area at the base or other desired locations near a wide variety of foliage, be it a small plant or large, dense, and thorny plants, all with maximum control and ease and with minimal labor and minimal chances of injuries to the person. In addition, the present invention was conceived to enable a single person to be able to fertilize trees without the conventional necessity for cumbersome maneuvers or messy soil removal and displacement.

BACKGROUND OF THE INVENTION

According to a preferred embodiment of the invention a granule dispensing device is provided and includes a chamber having a predetermined volume for housing granules and defining a flow path for a flow of granules, a valve assembly for controlling the flow path, and an actuator configured to actuate the valve assembly for dispensing granules.

According to another embodiment of the invention, the chamber defines a first slot on a first wall and a second slot on a second spaced-apart and opposing wall.

According to another embodiment of the invention, the flow path is allowed to flow into the first slot when the actuator is in a first position and into the second slot when the actuator is in a second position.

According to another embodiment of the invention, the chamber further includes a ramp.

According to another embodiment of the invention, the chamber defines a greater area about the first slot than an area about the second slot such that the ramp decreases the area of the chamber towards the second slot.

According to another embodiment of the invention, the actuator further includes a plurality of stop members configured to restrict movement of the chamber beyond the first position and the second position.

According to another embodiment of the invention, the dispensing device also includes at least one rake member positioned about an end of the granule dispensing device for moving undergrowth away from a desired fertilizing position.

According to another embodiment of the invention, the granule dispensing device also includes a channel within the flow path for providing a passageway for the flow of granules to enter the chamber.

According to another embodiment of the invention, the granule dispensing device includes a funnel for providing access to the channel through an opening formed in the channel.

According to another embodiment of the invention, the funnel has an open position and a closed position and the funnel comprises a shroud having a contour approximating a contour of the channel and is hinged about the channel such that the funnel maintains about the same shape as the channel when the funnel is the closed position.

According to another embodiment of the invention, the actuator comprises a pair of shrouds connected by a longitudinally extending member, and the actuator moves between a first position and a second position by rotation of the pair of shrouds.

According to another embodiment of the invention, the chamber defines a first opening and a shroud of the pair of shrouds defines a second opening, wherein the first opening and the second opening are generally misaligned when the actuator is in the first position, and the first opening and the second opening are generally aligned when the actuator is in the second position, thereby allowing a flow of granules through the second opening when the actuator is in the second position.

According to another embodiment of the invention, the granule dispensing device further includes a channel within the flow path for providing a passageway for the flow of granules to enter the chamber.

According to another embodiment of the invention, the granule dispensing device includes a funnel comprising a shroud having a contour approximating a contour of the channel and hinged about the channel such that the funnel has an open position and a closed position and maintains about the same shape as the channel when the funnel is in the closed position.

According to another embodiment of the invention, the chamber includes a first slot on a first wall of the chamber and a second slot on a second wall of the chamber, wherein the second wall is spaced-apart from the first wall, and the actuator blocks the first slot and does not block the second slot when the actuator is in a second position, and blocks the second slot and does not block the first slot when the actuator is in a first position.

In another preferred embodiment of the invention, a granule dispensing device is provided and includes a granule dispensing chamber having a predetermined volume and defining a tapered shape such that the area of the chamber decreases towards an end of the chamber, a channel in communication with the granule dispensing chamber and configured to allow a flow path of granules to flow into the dispensing chamber, a valve assembly positioned within the chamber and configured to control the flow path of granules, and an actuator configured to actuate the valve assembly for dispensing the valves, whereby actuation of the actuator is operable to move the valve assembly between and open and a closed position.

BRIEF DESCRIPTION OF THE DRAWINGS

FIG. 5 is a side view of a granule dispensing device in a first closed position according to an alternate embodiment of the present invention;

FIG. 6 is an enlarged side view of the granule dispensing device in a second open position as shown in FIG. 5;

FIG. 7 is an enlarged side view of the granule dispensing device as shown in FIG. 5;

FIG. 8a is an enlarged cross sectional view of the granule dispensing device in a first closed position as shown in FIG. 5; and FIG. 8b is an enlarged cross sectional view of the granule dispensing device in a second open position as shown in FIG. 5.

DETAILED DESCRIPTION OF THE INVENTION

Figure 1:
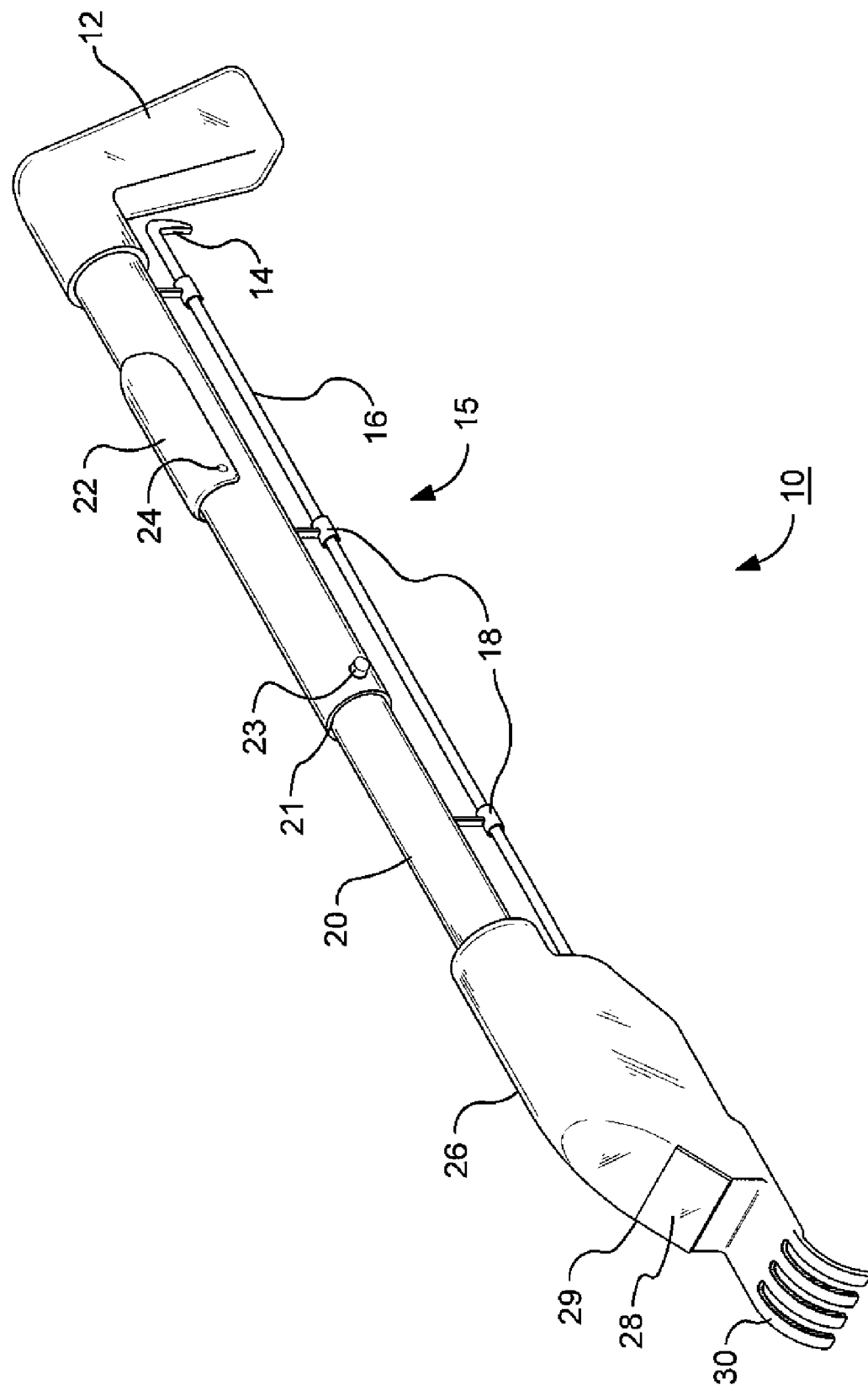
FIG. 1 is a perspective view of a granule dispensing device according to the present invention.

Referring to the drawings wherein identical reference numerals denote the same elements throughout the various views, a granule dispensing device 10 is shown throughout FIGS. 1-4.

As shown generally throughout the Figures and particularly in FIG. 1, a granule dispensing device 10 is provided and generally includes a handle 12 connected with a channel 20 and a dispensing housing 26. The granule dispensing device 10 is preferably used for dispensing fertilizer but may also be used for dispensing any similar granular compound. The handle 12 may include a gripping layer and has a general contour to provide comfortable gripping by a hand of an operator. The channel 20 may be glued, soldered, wedged, fastened, or any other suitable method of attachment, to the handle 12. The dispensing housing 26 is also attached in a like manner to the channel 20. The dispensing housing 26, channel 20, and handle 12 are all formed from a suitable material, and may be made from plastic, PVC, another polymer based material, glass, paper, or the like. The channel 20 may be divided in sections and adjustable about any amount of length by addition of multiple sections. The sections may be formed about a section end 21 and a detent 23 configured to fit within a corresponding opening of the channel 20. In this manner, the granule dispensing device 10 is adjustable in length.

The dispensing housing 26 includes an access door 28 hinged about a hinge point 29. The access door 28 allows access to the inner portions of the dispensing housing 26 for ease of cleaning, maintenance, and repair. At least one rake member 30 is provided about an end of the dispensing housing 26 for raking granules into the soil or for moving undergrowth away from a desired dispensing target.

Figure 2:
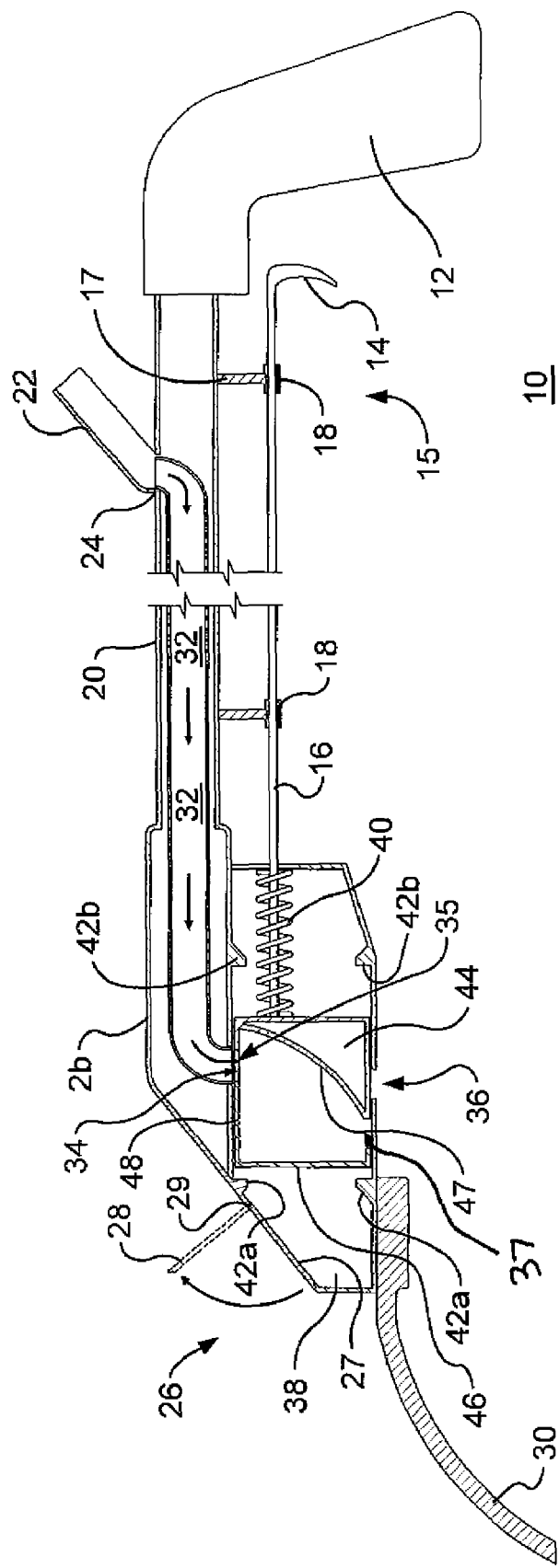
FIG. 2 is a side cross sectional view of the granule dispensing device in a first position according to the present invention.

An actuator 15 is provided and generally includes a trigger 14 positioned proximal the handle 12 and a linear linking member 16 carried by a pair of support rails 18 attached to support hangers 17 hanging from the channel 20, as shown in FIG. 2. The actuator 15 is configured to operate a valve assembly that maintains the flow of granules from the dispensing housing 26. A funnel 22 is provided and is hinged about a hinge point 24 attached to the channel. The funnel 22 has a shape contour generally approximating the shape contour of channel 20. The funnel 22 has a closed position, as shown in FIG. 1, in which the funnel 22 does not provide access to the channel 20 and an open position, as shown in FIG. 2, in which the funnel 22 is flipped outwardly and provides access to the channel 20. When the funnel 22 is in the closed position, the funnel shape is such that it does not generally extrude beyond the shape of the channel 20.

Figure 3:
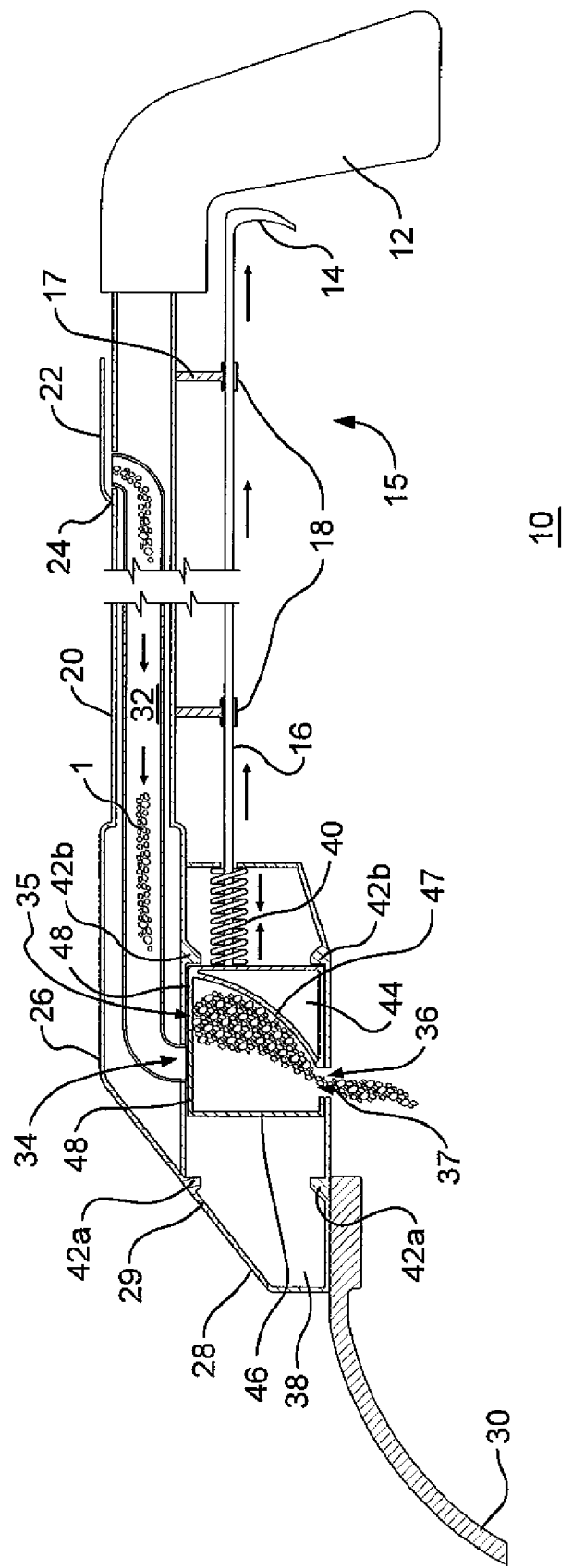
FIG. 3 is a side cross sectional view of the granule dispensing device in a second position according to the present invention.
Figure 4:
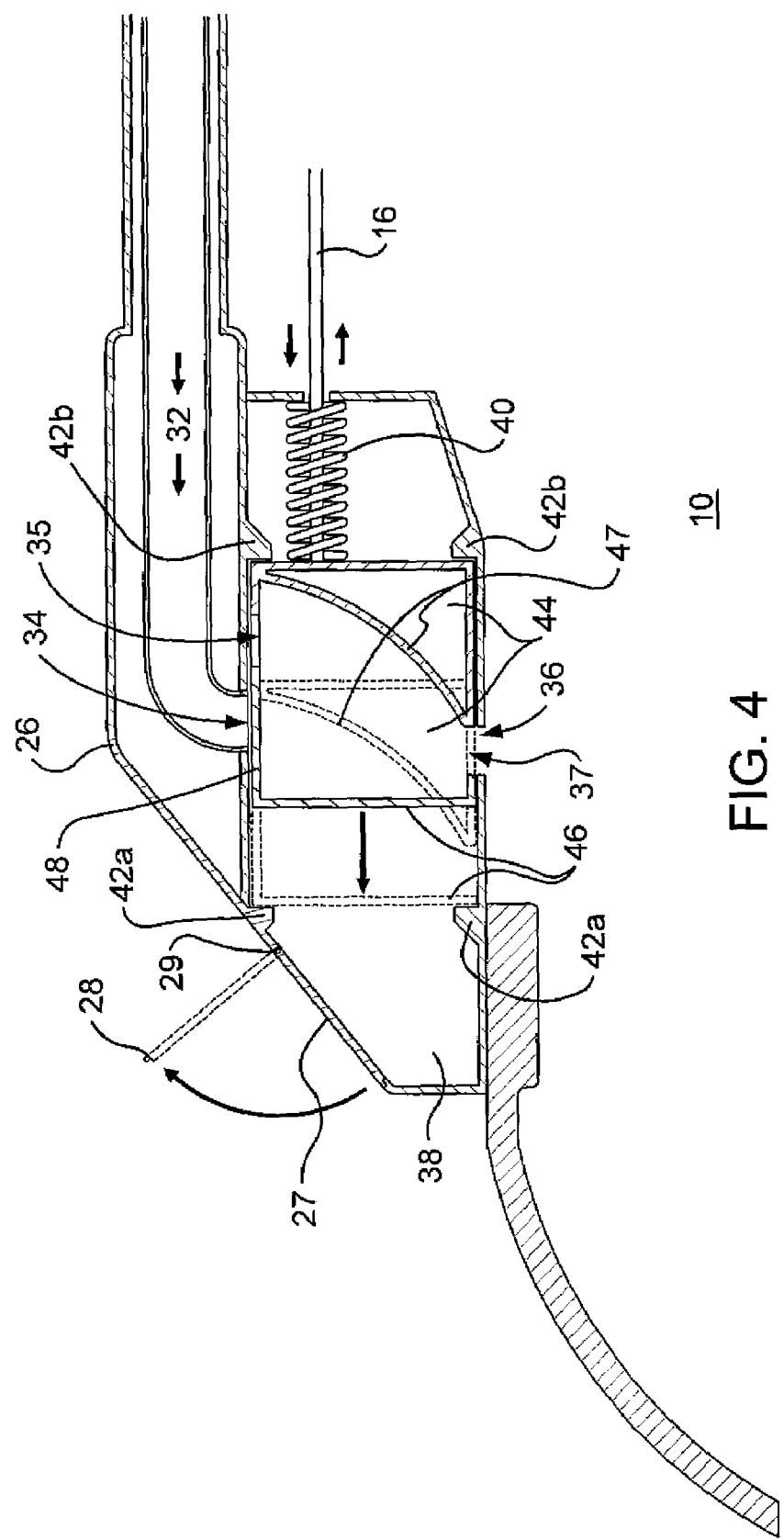
FIG. 4 is an enlarged side cross sectional view of the granule dispensing device according to the present invention.

A cross sectional view of the granule dispensing device 10 is shown in greater detail in FIGS. 2-4. A granule dispensing passageway 32 is defined by the channel 20 and generally carries granules from the funnel 22 to a filling chamber 44 of the dispensing housing 26. Together the actuator 15 and chamber 44 work to define a valve assembly. The linear linking member 16 is attached to the chamber 44 and may further include a biasing member 40 positioned between the chamber 44 and a sufficiently rigid element such as a back wall of the dispensing housing 26. The chamber 44 may include a ramp 47 configured to reduce the area of the chamber 44 as granules dispense from a top of the chamber 44 to a bottom of the chamber 44. In this manner, the flow of granules flows to the opening 36 and provides a consistent and smooth flow of granules. As shown in FIG. 2, the actuator 15 is in a first position. In the first position, a slot 34 of the passage 32 generally overlaps a slot 35 of the chamber 44. In this manner, granules are allowed to flow into the chamber 44 when the actuator 15 is in the first position. The chamber 44 has a predetermine volume and, therefore, only allows a predetermine volume of granules to fill the chamber 44. Accordingly, when an operator dispenses fertilizer, the amount of fertilizer is precise and consistent from each successive dispensing. As shown in FIG. 4, the chamber 44 includes a slot 37 positioned about a lower portion of the chamber 44. A corresponding slot 36 is provided in the dispensing housing 26.

When the actuator 15 is in a second position, slots 36 and 37 are generally aligned, while slots 34 and 35 are generally not aligned, allowing the flow of granules to flow from the chamber 44 to the desired dispensing area. A plurality of stop members 42a, 42b are provided to restrict movement of the chamber 44 when the actuator 15 is between the first position and the second position. The access door 28 is opened about hinge point 29 and provides an opening 27 into the chamber 44 and further defines a recess 38 formed with a front wall 46 of the chamber 44.

As shown in FIG. 4, the chamber 44 is represented by darkened lines when the actuator 15 is in the second position and by dashed lines when the actuator 15 is in the first position. Movement of the actuator 15 between the first position and the second position is effected by linear movement of the linear linking member 16 by pulling of the trigger 14. Other appropriate methods of actuation may be employed such as an electric motor, an eccentric rotation member, or any other suitable method. After disposing the desired amount of granules, the raking member 30 can be used to rake the granules into the soil. If desired, the soil may be raked before dispensing the granules.

In a preferred embodiment of the present invention, the filling chamber 44 has a volume of four table spoons. Four table spoons represents about the smallest amount of fertilizer that would be needed with most applications. The granule dispensing device 10 is configured such that the trigger 14 may be pulled several times to actuate the actuator 15 and dispense multiple fillings of the filling chamber 44. In this preferred embodiment, the operator could dispense three fillings of the filling chamber 44, or 12 table spoons. This allows for excellent versatility of the present invention, and will allow the operator to use this one device for almost any fertilizing need.

An alternate embodiment of the present invention is shown throughout FIGS. 5-8. A granule dispensing device 110 is provided and is generally used for dispensing fertilizer. The granule dispensing device 110 includes a handle 112 attached to a channel 120 and to a dispensing housing 126. The handle 112 may include a gripping layer and has a general contour to provide comfortable gripping by a hand of a person. The channel 120 may be glued, soldered, wedged, fastened, or any other suitable method of attachment, to the handle 112. The dispensing housing 126 is also attached in a like manner to the channel 120. The dispensing housing 126, channel 120, and handle 112 are all formed from a suitable material, and may be made from plastic, PVC, another polymer based material, glass, paper, or the like. A funnel 122 is provided and is hinged about a hinge point 124 attached to the channel. The funnel 122 has a shape contour generally approximating the shape contour of channel 120. The funnel 122 has a closed position in which the funnel 122 does not provide access to the channel 120 and an open position in which the funnel 122 is flipped outwardly and provides access to the channel 120. When the funnel 122 is in the closed position, the funnel shape is such that it does not generally extrude beyond the shape of the channel 120.

An actuator 115 is provided and includes a first shroud 116 and a second shroud 118 connected by a linking member 128 defining a longitudinally extending member. The second shroud 118 defines an opening 134 for allowing a flow of granules to flow from within a passage 132 formed within the channel 120. The channel 120 defines an additional opening 136. A driving support 147 is provided for driving a spike 130 of the granule dispensing device 110 into the area to be fertilized. The driving support 147 may be driven with a mechanical agitator of some type including driving in with an operator's foot, a hammer, or other suitable method. The spike 130 is provided for driving into the ground and for securing the granule dispensing device 110 into the ground. The spike 130 may be a cross shaped spike as shown in the drawings, or may be a smooth spike approximating a sharp point. The spike 130 is sized such that a complementary cavity in the ground formed by the spike 130 is of sufficient volume for housing dispensed fertilizer. In this regard, if it is desired to dispense 2 ounces of fertilizer about one point at the tree drip line, then the spike will be sized so as to have a volume of at least approximately 2 ounces. The spike 130 will preferably form the complementary cavity upon insertion into the ground, but it may be necessary to rock the granule dispensing device 110 along a horizontal plane to compress the soil and form the complementary cavity. Preferably, a complementary cavity is formed at multiple points along the tree drip line. This cavity is shaped to provide precise amounts of fertilizer to the tree.

As shown in greater detail in FIGS. 7, 8a, and 8b, the actuator 115 acts to allow a flow of granules to exit out of opening 134. The flow of granules is provided within a chamber 144 defined by walls of the channel 120. The chamber 144 has a predetermined volume, thus allowing the operator to fill the chamber 144 with a predetermined amount of fertilizer. As shown in FIG. 8a, the actuator 115 is in a first position and opening 134 is not aligned with opening 136 of the shroud 118. In this manner, a flow of granules within passage 132 will not be allowed to pass into an exterior. As shown in FIG. 8b, the actuator 115 is in a second position and opening 134 is aligned with opening 136, thereby allowing a flow of granules through the second opening when the actuator 115 is in the second position. The movement of the actuator 115 from the first position to the second position is accomplished by rotational movement imparted from an operator input. Any suitable method of rotation may be employed. Preferably, the operator grabs shroud 116 and rotates the actuator assembly 115 to move between the first position and the second position. Once the actuator 115 is in the second position, granules are dispensed. The operator then rotates actuator 115 back into the first position. The volume of fertilizer to be dispensed will depend on the time that the actuator is in the second position and the type of fertilizer being dispensed. Once the chamber 144 has run out of fertilizer, the operator then opens the funnel 122 and fills the chamber 144 with the predetermined amount of fertilizer. The steps are repeated as desired by the operator. In preferred embodiments, the volume of granule in the chamber 144 is substantially more than is necessary to fill the complementary cavity. In this manner, the operator may be able to fill many complementary cavities without having to refill the granule dispensing device 110.

The foregoing has described a granule dispensing device for dispensing fertilizer proximate a desired fertilizing area. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. A granule dispensing device, comprising:
   a gripping handle;
   a dispensing housing having a granule chamber movably disposed therein, the granule chamber movable between a dispensing position in which a first slot of the chamber is aligned with a slot of the dispensing housing, and a position in which the first slot of the chamber and the slot of the dispensing housing are misaligned, the granule chamber including a ramp therein that reduces chamber volume from a top of the chamber to the first chamber slot;

an elongate channel interconnecting the handle and the dispensing housing, the elongate channel defining a granule flow passageway therethrough extending between a fill portion and the granule chamber; and an actuator for moving the granule chamber relative to the dispensing housing, the actuator including a trigger operated linear linking member disposed within a support rail carried beneath and outside of the elongate channel, the actuator further including a biasing spring disposed around a portion of the linking member within the dispensing housing and seated between an interior wall of the dispensing housing and an exterior wall of the granule chamber.

2. The granule dispensing device according to claim 1, wherein the chamber defines a second slot opening the granule chamber to the flow passageway of the elongate channel.

3. The granule dispensing device according to claim 2, wherein the chamber defines a greater area about the second slot than an area about the first slot such that the ramp decreases the area of the chamber towards the first slot.

4. The granule dispensing device according to claim 1, further including at least one rake member positioned about an end of the granule dispensing device for moving undergrowth away from a desired fertilizing position.

5. The granule dispensing device according to claim 1, further including a funnel for providing access to the channel through an opening formed in the channel.

6. The granule dispensing device according to claim 5, wherein the funnel has an open position and a closed position and the funnel comprises a shroud having a contour approximating a contour of the channel and hinged about the channel such that the funnel maintains about the same shape as the channel when the funnel is the closed position.

7. The granule dispensing device according to claim 1, wherein the actuator comprises a pair of shrouds connected by a longitudinally extending member, and the actuator moves between a first position and a second position by rotation of the pair of shrouds.

8. The granule dispensing device according to claim 7, wherein the chamber defines a first opening and a shroud of the pair of shrouds defines a second opening, wherein the first opening and the second opening are generally misaligned when the actuator is in the first position, and the first opening and the second opening are generally aligned when the actuator is in the second position, thereby allowing a flow of granules through the second opening when the actuator is in the second position.

9. The granule dispensing device according to claim 8, further including a channel within the flow path for providing a passageway for the flow of granules to enter the chamber.

* * * * *